United States Patent [19]

Kotz et al.

[11] Patent Number: 4,927,285
[45] Date of Patent: May 22, 1990

[54] BALL JOINT DESIGN

[75] Inventors: Steven P. Kotz, Norwalk; John H. Lane, Hudson, both of Ohio

[73] Assignee: The Pullman Company, Princeton, N.J.

[21] Appl. No.: 353,170

[22] Filed: May 15, 1989

Related U.S. Application Data

[63] Continuation of Ser. No. 151,729, Feb. 19, 1988, abandoned.

[51] Int. Cl.⁵ .............................................. F16C 11/00
[52] U.S. Cl. ...................................... 403/133; 403/130
[58] Field of Search ............... 403/133, 130, 137, 132, 403/135, 139, 128, 124, 140, 143, 225–228, 334, 372

[56] References Cited

U.S. PATENT DOCUMENTS

| | | | |
|---|---|---|---|
| 2,878,046 | 3/1959 | Lutzen | 403/130 |
| 3,347,576 | 10/1967 | Templeton | 403/133 X |
| 3,408,124 | 10/1968 | Melton et al. | 403/130 X |
| 3,413,023 | 11/1968 | Herbenar | 403/135 |
| 4,235,558 | 11/1980 | Snyder et al. | 403/130 |
| 4,439,909 | 4/1984 | Borgen et al. | 403/135 X |
| 4,555,198 | 11/1985 | Wenning et al. | 403/130 |
| 4,626,121 | 12/1986 | Tajima et al. | 403/132 X |
| 4,629,352 | 12/1986 | Nemoto | 403/132 X |
| 4,643,608 | 2/1987 | Warner | 403/130 X |
| 4,695,182 | 9/1987 | Wood, Jr. | 403/133 X |

FOREIGN PATENT DOCUMENTS 762047  1/1934  France ................ 403/133

Primary Examiner—Peter M. Cuomo
Attorney, Agent, or Firm—Russell E. Baumann

[57] ABSTRACT

A ball joint construction having a ball-stud member with a ball portion and a shank portion and an open-ended socket member in which the ball portion is contained. An elastomeric covering is permanently bonded to the ball stud and then deformed for inserting in the socket thereby resiliently interconnecting the socket and ball members. The socket member is provided with an inner wall portion with an outwardly tapered portion toward the bottom end of the socket.

5 Claims, 1 Drawing Sheet

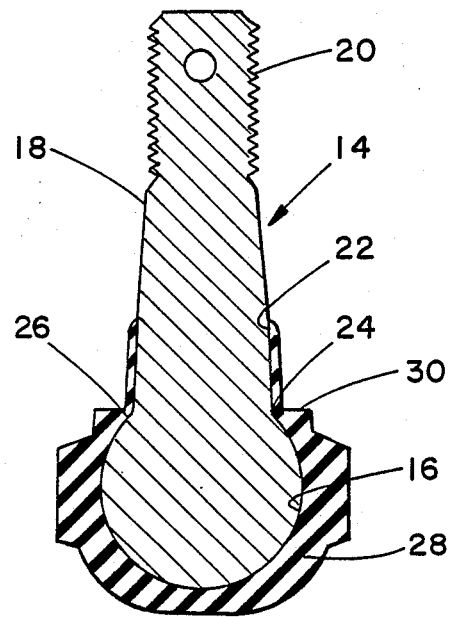
FIG. 1
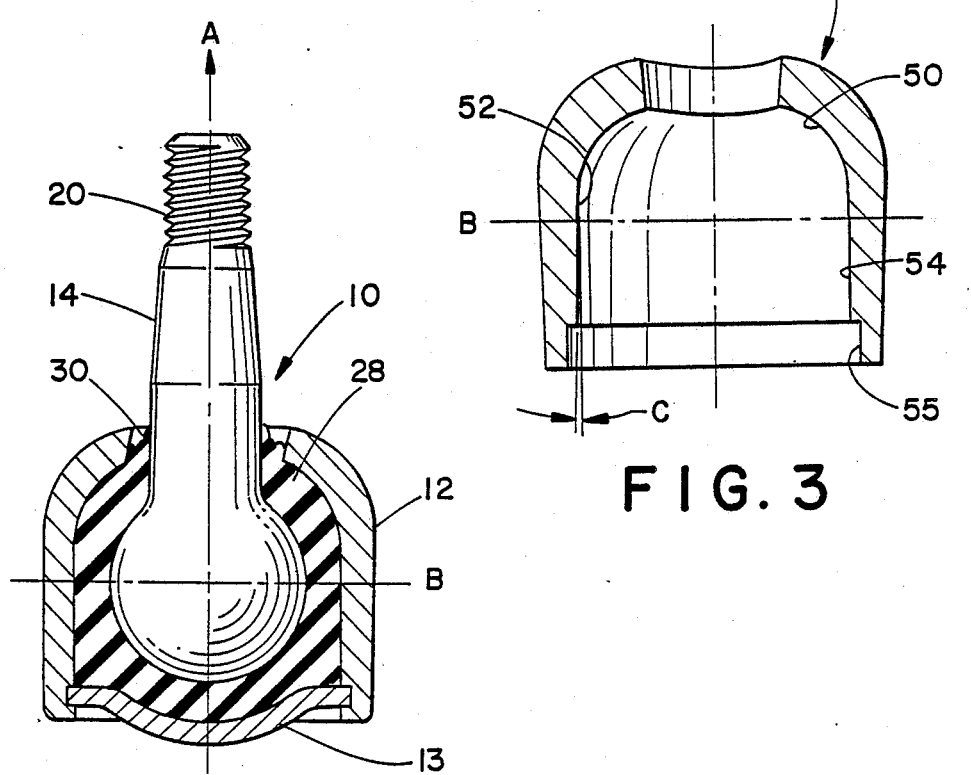
FIG. 3
FIG. 2

BALL JOINT DESIGN

This application is a continuation of application Ser. No. 151,729, filed Feb. 3, 1988, now abandoned.

BACKGROUND OF THE INVENTION

The present invention relates to elastomeric ball joints and is more particularly directed to ball and socket type joints as commonly used in steering linkage arms, power steering systems, front end suspension systems and the like.

A great many different types of ball and socket joints have been utilized to interconnect various moving elements in vehicles. A continuing problem with ball joint designs has been the tendency of metal ball members with the elastomeric material bonded thereto to pull out of the socket in the direction of the open-ended window area. Various design changes have been made in an effort to minimize this stud pull out problem such as described in U.S. Pat. No. 4,235,558, assigned to a predecessor corporation of the instant assignee. Although successful, these new past designs still do not totally correct the problem. There is still a strong need for a ball joint design with improved reliability which better protects against ball pull out. The concepts of the subject invention are deemed to meet these needs and provide a new and improved ball joint arrangement and method of manufacture which is simple in design, long lasting, economical to manufacture, reliable, prevents ball stud pull out and adapts readily to a wide variety of applications.

BRIEF SUMMARY OF THE INVENTION

In accordance with the present invention, there is provided an elastomeric ball joint assembly for use in motor vehicle front suspension, steering linkages or the like. The assembly includes a ball stud member with a ball portion and a shank portion and a socket member for receiving the ball stud member with an end cap member for essentially completely closing off one end of the stud member after assembly. The ball stud shank portion extends through the window opening opposite the end cap member. A continuous elastomeric covering is bonded to the ball stud member and the member with elastomeric material is deformed and inserted in the bottom open end of the socket opposite the window opening and then the end cap is crimped closing bottom open end thereby resiliently interconnecting the socket and the ball stud. A taper on the socket bottom portion housing member toward the closed end is provided which decreases compression away from the housing window and minimizes the tendency for the ball stud to "walk-out" the open window area.

In accordance with another aspect of the present invention a taper in the socket member is provided with a generally tapered angle of one degree or greater.

In accordance with another aspect of the present invention a taper in the socket is provided, such taper starting at generally the center axis of the pivot joint and extending toward the bottom end of the socket which is closed after assembly.

In accordance with yet another aspect of the present invention the ball joint is assembled by the method of inserting the ball stud from the bottom open end with shank portion extending through the open window and then closing off the bottom open end. This method of assembly provides for better control of stress/strain on the rubber bonded ball member and thus increases bond life.

The principle object of this invention is to provide an improved elastomeric ball joint.

Another object of this invention is to provide an improved elastomeric ball joint which minimizes the effect of ball stud pull out/"walk out" and thus is highly reliable in operation.

Other objects and advantages will become apparent hereinafter when the following specification is read in conjunction with the accompanying drawings and claims:

BRIEF DESCRIPTION OF THE DRAWINGS

FIG. 1 is a partial longitudinal section view of a ball joint of this invention showing the socket, the ball stud, the elastomer layer, the end cap crimped in place, and the window in the socket;

FIG. 2 is a cross sectional view of the ball stud of this invention with the elastomer layer bonded thereto in the free state prior to assembly in the socket, and FIG. 3 is a partial section view of the socket of this invention.

DESCRIPTION OF THE PREFERRED EMBODIMENTS

In view of its use in this specification and in the claims that follow, it should be explained that by the word "elastomer" is meant any rubber-like polymeric material, and the words "rubber" or "rubber-like" may hereinafter be used as equivalents. The term "elastomer" is a general descriptive word for rubber-like, polymeric materials and is sometimes considered as an abbreviation for elastopolymer and elastic polymer. As herein used, it may be understood to cover the high molecular elastic colloid, natural caoutchouc, synthetic rubber, synthetic natural rubber, as well as the rubber-like materials such as neoprene, butyl rubber and the styrenebutadiene copolymer.

In the ball stud and socket arrangement which is shown generally in FIGS. 1–3, numeral 10 designates a ball joint with a socket portion 12 with end cap 13 for closing off one end of the socket portion thereby providing an open-ended socket and a ball stud portion 14. Ball stud portion 14 typically made from metal such as steel has a generally spherical ball member 16 with shank portion 18 depending therefrom.

Shank portion 18 typically has a threaded distal end portion 20 and a tapered portion 22 which terminates at an underside portion 24 of ball member 16, as shown in FIGS. 1 and 2. The diameter of the ball member across the underside portion 24 will be larger than the largest diameter of tapered shank portion 22. The contour of the ball will ordinarily be of a circular conformation, although other contours may, upon occasion, be used for special purposes. Preferably the top of the ball will have a flatter portion identified generally at 26.

Secured to portions of ball-stud 14 is an elastomer coating layer 28 which is attached to the surface by bonding or other appropriate adhesion as is known in the art. More particularly, elastomer coating layer 28 is permanently chemically bonded to ball 16 and also the top portion of tapered shank portion 22 adjacent ball portion 16. The elastomer coating is preferably one continuous bonded piece with the covering on the very top of the ball and the covering on the tapered shank portion having a thin-wall thickness. Additionally a rib or lip 30 of elastomer may be provided extending up from the surface of the elastomer that covers underside portion 24 adjacent shank portion 22.

This rib provides additional elastomer material at the high stress area of torsional and angular movement and also provides for improved surface tension parameters and thus greater ball joint life.

In accordance with this invention, socket portion 12 has a generally curved top side wall portion 50 which forms the top window area of the ball joint. This window area has a diameter less than the diameter of the ball member 16 so that the ball member can not generally pass through the socket window. Curved top side wall portion 50 is integrally jointed a straight cylindrical side wall portion 52 which in turn is integrally jointed and part of a flared or tapered cylindrical side wall portion 54 as will be described in more detail hereinafter. It is also within the scope of this invention to have top side wall portion directly integrally joint with tapered cylindrical side wall portion 54. At the distal end of tapered side wall portion 54 is a reduced thickness deformable wall portion 55. The end cap 13 is crimped by deforming this distal bottom end portion 55 of wall portion 54 closing off the bottom of socket 14.

In assembly, the ball stud with elastomer coating of varying wall thickness as shown in FIGS. 1 and 2 is assembled by inserting said shank portion of the ball stud through the bottom opening of the socket with the shank portion extending through the top window area of the ball joint. A suitable lubricant such as a light weight naphanic oil is put on the elastomer which allows the elastomer to be deformed and correctly positioned in the socket to provide for minimal stress in the high stress window area. An example of a suitable oil is Sun Oil Company's CIRCO-LITE ® rubber processing oil. After insertion of the ball stud in the properly controlled position, cap 13 is positioned to close off the bottom of the socket and the bottom portion 56 of side wall 54 is crimped to hold it in place by conventional means. Other means of securing cap 13 could equally well be used.

In accordance with this invention, socket member 12 s shown specifically in FIG. 3 is provided with an internal wall configuration with a curved top portion 50 for retaining the ball stud in the socket as assembled and an outwardly tapered bottom walled portion 54 to decrease stress concentration during operation of the joint assembly in the critical window area. Optionally a central straight cylindrical wall portion 52 may be used to help with precise location of the ball stud during assembly. It has been found preferable to start the taper at a point in the socket side wall at or above the center line of the pivot joint (marked as B in FIGS. 2 and 3). This decrease in stress concentration has shown significant increases in the assembly's functional life. For the purposes of this application the term "taper" shall include non-straight shapes such as straight angles, flares, radii and the like.

In operation a ball joint typically sees loading in one direction as shown in Arrow A in FIG. 2 with oscillation present. The loading with oscillation will cause the rubber covered ball stud to tend to move ("walk") in the direction of Arrow A (outwardly from the socket window) which greatly increases stress concentration in the rubber and thus bond stresses in the critical window area. A straight sided housing allows the rubber ball stud to more readily move toward the open window. The use of an outwardly tapered side wall toward the bottom of the side wall of the socket has greatly controlled the moving/"walking" of the ball stud in the direction of the window. This allows the ball stud to remain in its designed position in the socket. Tests have shown that with a tapered angle C of about one degree or greater the life of the ball joint assembly can be increased more than two times than that of an assembly with a straight walled socket for typical elastomers used.

This invention has been described with reference to a preferred and alternative embodiment. Obviously modifications and alterations will occur to others upon the reading and understanding of this specification. It is our intention to include all such modifications and alterations insofar as they come within the scope of the appended claims or the equivalent thereof.

Having thus described our invention we now claim:

1. In a bonded ball joint having a ball-stud member with a ball portion at one end and a shank portion at the other end; an open-ended socket member surrounding said ball portion in spaced relationship thereto, said open end of the socket member forming a window in the socket member through which said shank portion projects, the window and ball-stud member defining clearance therebetween the ball-stud member and the socket member without allowing the ball portion to pass through the window, and an elastomer coating layer, bonded to said ball stud member and resiliently interconnecting the ball stud member and the socket member, the improvement comprising:

said socket member having an inner wall portion, said inner wall portion being outwardly tapered away from the open end of the socket member in a smooth continuous manner for essentially its entire length for controlling and minimizing adverse stress concentration in the bonded ball joint.

2. The ball joint of claim 1 wherein said inner wall portion of said socket has an inwardly curved top portion adjacent the open end forming the window in the socket to help hold ball stud member with elastomer coating layer in place.

3. The ball joint of claim 2 wherein said inner wall portion of said socket has a middle essentially straight side walled cylindrical portion between said inwardly curved top portion and said outwardly tapered inner wall portion.

4. The ball joint of claim 2 wherein said outwardly taper in said inner wall portion is a straight angle of at least one degree.

5. The ball joint of claim 2 wherein said outwardly taper in said inner wall starts at or above the center axis of the pivot joint.

* * * * *